United States Patent [19]

Bräkelmann

[11] Patent Number: 4,552,167

[45] Date of Patent: Nov. 12, 1985

[54] METHOD OF AND DEVICE FOR CLEANING HOLLOW SPACES IN DOUBLE SEAT VALVES

[75] Inventor: Wolfgang Bräkelmann, Unna-Uelzen, Fed. Rep. of Germany

[73] Assignee: Holstein & Kappert GmbH, Dortmund, Fed. Rep. of Germany

[21] Appl. No.: 480,467

[22] Filed: Mar. 30, 1983

[30] Foreign Application Priority Data

Mar. 30, 1982 [DE] Fed. Rep. of Germany ....... 3211692

[51] Int. Cl.$^4$ ............................ B08B 3/02; B08B 9/02
[52] U.S. Cl. ................................... 137/15; 137/240; 137/312; 137/614.17; 137/614.18; 137/637.2; 134/166 C
[58] Field of Search ............... 137/15, 238, 240, 312, 137/614.17, 614.18, 637.2; 134/166 C

[56] References Cited

U.S. PATENT DOCUMENTS

| | | | |
|---|---|---|---|
| 2,305,724 | 12/1942 | Luetzelschwab | 137/240 |
| 3,133,554 | 5/1964 | Joebken | 137/240 |
| 4,304,251 | 12/1981 | Schädel et al. | 137/240 |
| 4,360,039 | 11/1982 | Jeppsson | 137/240 |
| 4,368,753 | 1/1983 | Bräkelmann | 137/240 |
| 4,373,545 | 2/1983 | Knappe | 137/614.17 |
| 4,436,106 | 3/1984 | Tuchenhagen et al. | 137/312 |

FOREIGN PATENT DOCUMENTS 2076116  11/1981  United Kingdom ............... 137/240

Primary Examiner—George L. Walton
Attorney, Agent, or Firm—Michael J. Striker

[57] ABSTRACT

A double seat valve, preferably a multi-way valve having two valve disks movable independently one against the other and against the valve seats, defines an annular space between the two valve disks which is connected to the outer atmosphere by a discharge conduit. According to the invention, at least three nozzles project axially in the discharging conduit to eject jets of cleaning liquid along the inner wall of the conduit, then the jets are bent radially outwardly along the lower surface of the upper valve disk, spread into circular segments which mix together along the boundary lines and then the mixed cleaning liquid is returned along the inner surface of the lower valve disk and discharged through the opposite wall of the discharge conduit.

5 Claims, 3 Drawing Figures

4,552,167

METHOD OF AND DEVICE FOR CLEANING HOLLOW SPACES IN DOUBLE SEAT VALVES

BACKGROUND OF THE INVENTION

The present invention relates in general to a double seat valve of the type defining an annular leakage fluid collecting space or chamber between two valve disks and an annular discharge conduit which communicates with a bottom portion of the chamber to discharge the leakage liquid. In particular, the invention relates to a method of and a device for cleaning this annular chamber.

With increasing automation of beverage processing plants, it is required to provide an automatic cleaning of paths of flow of the processed produce. For this purpose, program control chemical cleaning methods have been developed in which the cleaning steps can be remotely controlled. In this known process, valves are employed by means of which both occasional and fixedly determined operational cycles are controlled. In using control valves of this kind, for example in tank batteries, the individual operational cycles such as filling, discharging, cleaning and disinfecting must be carried out in simple manner. Due to the strict safety requirements, it is necessary that cleaning liquids be completely separated from the processed product. For this reason, especially in the beverage industry, double seat valves with two valve disks are used. The two disk valves of each double seat valve bound a hollow space therebetween which communicates with a leakage fluid discharge conduit. The free end of the latter conduit, which is remote from the valve seat, opens in the atmosphere. In this manner, any defective seal of the valve can be readily detected from the amount of discharged leaking liquid, and the sealing defect can be removed before major damage occurs.

In order to clean the discharge space for the leaking liquid, a spray pipe has been arranged within the outer part of the discharge conduit for the leaking fluid. It has been found, however, that the application of such a spraying pipe for attacking the hollow space with cleaning liquid is insufficient for achieving all desired effects.

SUMMARY OF THE INVENTION

It is therefore a general object of the present invention to overcome the aforementioned disadvantages.

More particularly, it is an object of the invention to provide an improved method of cleaning hollow spaces in double seat valves which reliably and faultless cleans all wall surfaces both in the hollow space bounded by the valve disks between the valve seats and the inner walls of the downwardly directed leakage fluid discharge conduit.

Another object of the invention is to provide such an improved method which permits the cleaning liquid to reach the regions in hollow spaces present in double seat valves which hitherto have been accessible only by taking special precautions.

An additional object of the invention is to provide a device for performing the method of this invention.

In keeping with these objects and others which will become apparent hereafter, one feature of the invention resides in a method of cleaning the aforedescribed hollow spaces in the double seat valves, in directing at least three jets of a cleaning liquid along the inner wall of smaller diameter of the annular discharge conduit for the leakage and bending the jets radially outwardly on the inner top wall of the annular space to spread the liquid in a sector of the inner top wall, then mixing the return flow along the adjoining flow sectors, and discharging the flow downwardly and radially inwardly along the bottom wall of the annular space and along the inner wall of larger diameter of the discharge conduit.

The double seat valve for carrying out the method of this invention is of the type including a central control member and two valve disks coaxially arranged around the central member and defining therewith an annular leakage collecting space which is connected to the outer atmosphere by means of a discharge conduit which is coaxilly arranged around the central member and communicates with a bottom portion of the lakage collecting space. According to this invention, at least three cleaning nozzles are symmetrically arranged in the leakage discharge conduit to eject substantially parallel jets of cleaning liquid upwardly along the inner wall of smaller diameter of the discharge conduit, the jets being bent and spread along sectors of the inner top wall of the collecting space and upon intermixing, discharged along the inner wall of larger diameter of the discharge conduit.

By the method and device of this invention, a faultless cleaning of the entire inner surface of the hollow spaces in the double seat valve is achieved. The jets of cleaning liquid propagate parallel to the inner wall of the leakage discharge conduit in the hollow space between the two valve disks and sufficiently sweep the corresponding inner wall portions. Thereafter the jets are bent radially inwardly along the inner surface of the top of the annular leakage collecting space and, in doing so, they reach all salient cavities in the marginal range of the hollow space. At the same time, due to the symmetrical arrangement of the jets, the cleaning liquid is distributed along circular sectors of the upper wall of the cleaning space and the sector-like films of cleaning liquid mix with each other along the boundary lines of the sectors and are returned downwardly on the sloping bottom wall of the annular collecting space and discharged along the inner wall of larger diameter of the discharge conduit. During the mixing of the flow sectors, the spreading of the jets is under a continuous change so that an optimum cleaning turbulence is ensured.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
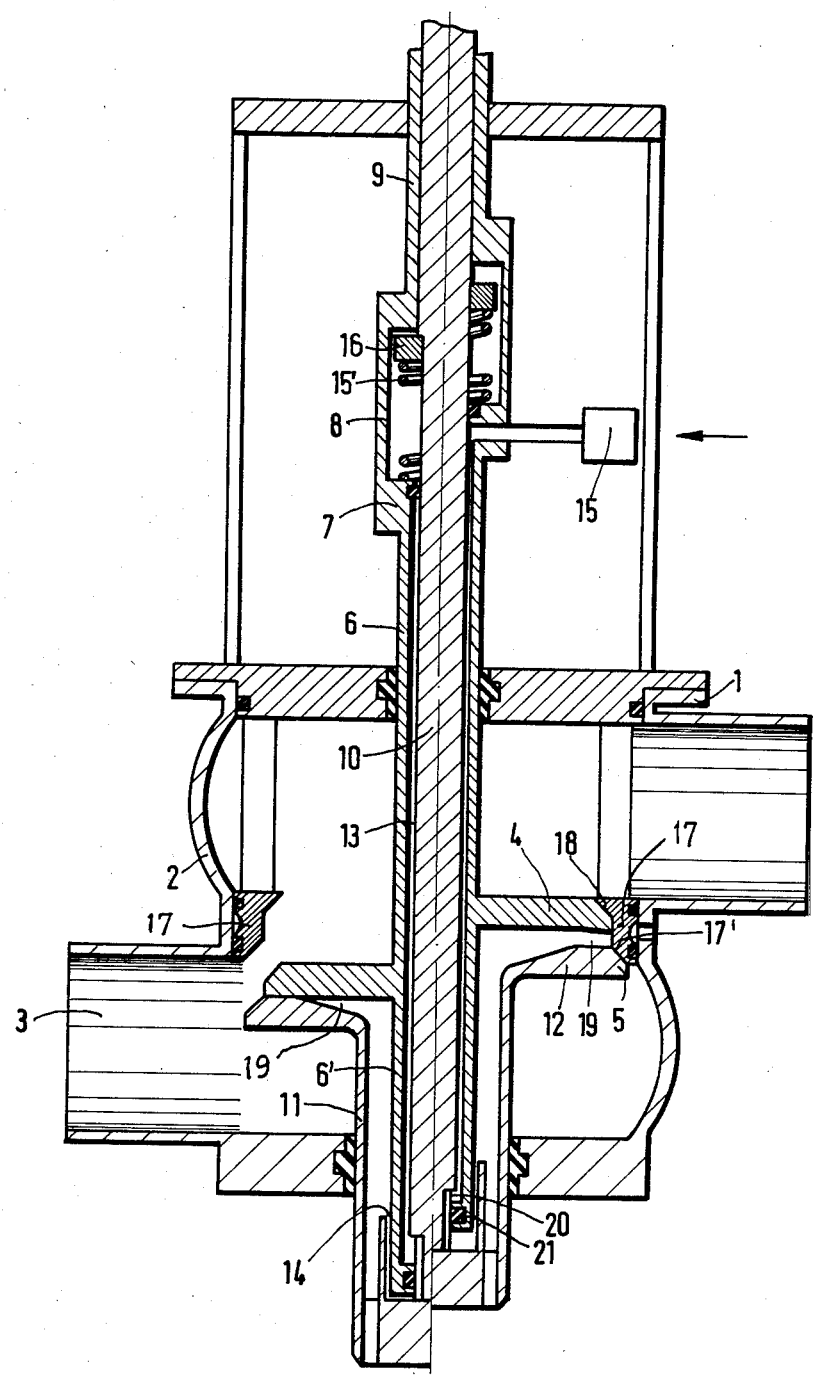
FIG. 1 is an axial section of a double seat valve of this invention.

Referring to the embodiment of a double seat valve of FIG. 1, there is illustrated a housing 1 assembled of two convexly shaped housing shells 2 and 3, each formed with a connection for an assigned conduit. Two mutually independent valve bodies 4 and 5 are arranged for movement along the center axis of the housing 1, each cooperating with assigned feed portion of the double seat insert 17. The upper vale body 4 is integrally connected to a hollow control rod 6 which is guided for reciprocating axial movement in the housing 1. The upper part of the control rod 6 is radially extended and connected to a sleeve 8 The upper end of sleeve 8 is connected to a piston rod 9 of a non-illustrated control device. An inner control rod 10 passes through the hollow control rod 6 and its lower end is connected to a tubular channel 11 coaxially surrounding the hollow control rod 6 and being connected to the second valve body 5. The annular space between the hollow control rod 6 and the tubular channel 11 forms an annular discharge passage for leaking liquid in the double seat valve. The upper part of the inner control rod 10 projects together with the piston rod 9 through the top of the housing 1. In the range of sleeve 8, the inner control rod 10 is reduced in diameter to define with the inner wall of the hollow rod 6 an annular channel 13 which communicates with an intake connection 15 formed in the radially extended part 7 of the hollow rod 6 for receiving cleaning liquid. The lower part of inner control rod 10 is further reduced in diameter to form an annular step which cooperates with an opposite step 21 at the end of the inner wall of the hollow control rod 6. A tubular member 14 surrounds with a small clearance the outer end portion of the hollow control rod 6 and projects into the annular discharge passage 11 for the leaking liquid. The annular conduit 14 communicates via the annular channel 13 with the intake connection 15 for a cleaning liquid. A helical pressure spring 15' rests on the top of the hollow control rod 6 within the sleeve 8 and engages via a ring 16 the inner control rod 10. The function of the spring 15' is to compress the larger disk 5 on valve body 12 against the smaller valve body or disk 4 and away from the double seat valve insert 17, as indicated in the left-side half of FIG. 1. The spring 15' also resiliently compresses the valve disks 4 and 5 against their respective seats 18 and 17' when the piston rod 9 is lifted in the right half of FIG. 1. As soon as the piston rod 9 is moved downwardly, the upper valve body or disk 4 is disengaged from its valve seat 18 and moves toward the lower vale disk 5 which is still urged by the action of pressure spring 15 against its valve seat 17'. During the farther downward movement of the valve disk 4 it abuts against the lower valve disk 5 and displaces the same away from its seat 17'. In this manner, an annular hollow space 19 will result between the valve disks 4 and 5 communicating with the downwardly directed leakage fluid discharging passage 11. In cleaning this area, the cleaning liquid from the connection 15 is injected through the annular channel 13 and the upwardly directed annular conduit 14 along the outer surface of the control rod 6; then the flow is bent along the lower surface of the valve disk 4 and returned along the upper surface of valve disk 5 and along the inner wall of the discharge passage 11. The cleaning process can take place in either position of the valve disks 4 and 5, as indicated in FIG. 1.

The recess 20 at the lower end of the inner control rod 10, and the counteracting annular step 21 at the end of the hollow control rod 6, are normally spaced apart by the action of the biasing spring 15. The purpose of this arrangement is to prevent sticking of the lower valve disk 5 in its open position. As soon as the two valve bodies or disks 4 and 5 are moved from their open position toward their closed position, the lower valve disk 5 is normally moved along via the compression spring 15'. If, however, for some reason or other the valve disk 5 is seized in its open position, then during the upward movement of the piston rod 9 the inner step 21 abuts against the recessed step 20 in the rod 6 and the valve disk 5 is forcibly freed from its clamped state, so that its can be resiliently displaced by the action of pressure spring 15 into its closed position in contact with the valve seat 17'.

Figure 2:
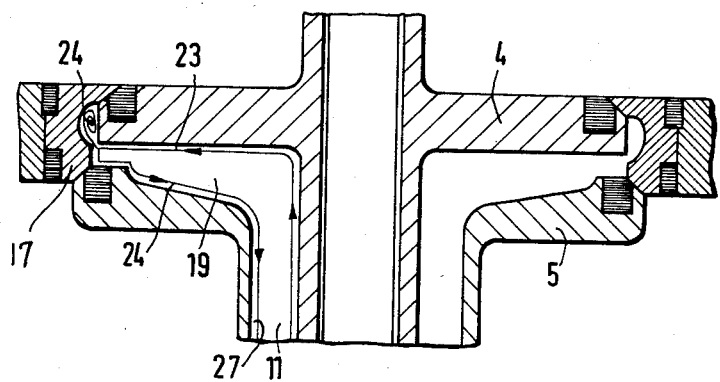
FIG. 2 is a sectional view of a cut away part of a modification of a double seat valve of this invention.
Figure 3:
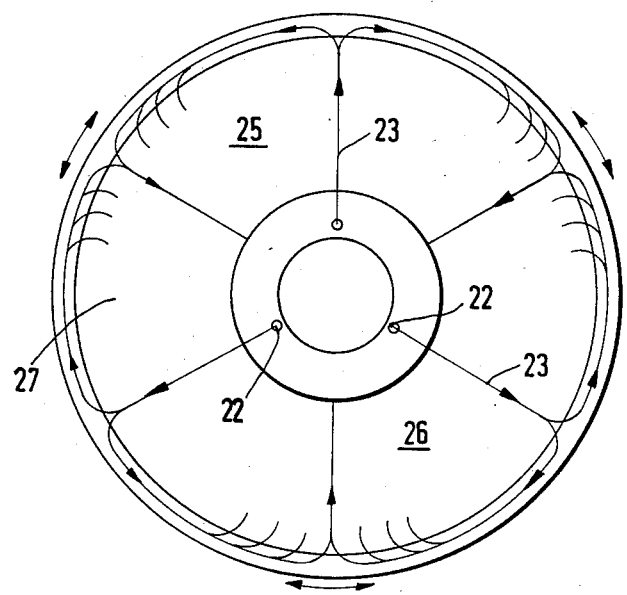
FIG. 3 is a sectional top view of annular spaces in the double seat valve of FIG. 2.

Referring now to the embodiment according to FIGS. 2 and 3, the annular channel 13 communicates with three cleaning nozzles 22 symmetrically distributed in axial direction along the outer end surface of the hollow control rod 6 and opening into the discharging passage 11 for the leaking liquid. Jets of cleaning liquid discharged through the nozzles 22 first propagate upwardly along the outer surface of the hollow rod 6 as far as to the top of wall of the hollow space 19, where each jet is bent and spread along the top of the space 19 in the manner as indicated by arrows 23. Each jet of cleaning liquid propagates radially outwardly and then is returned along the lower wall of the hollow space 19. Each jet 23 thus forms together with the returning jet portion a circular sector 25. The spread liquid in each sector mixes with the adjoining sectors 26 and, as mention before, is returned along the inner wall 27 of the discharge channel 11.

Due to the bending and subsequent dispersion of the respective jets of cleaning liquid on an annular outer wall 24 of the valve seat insert 17 in the hollow space 19, an increased turbulence of the cleaning liquid is produced which, particularly in the marginal zones of the hollow space 19, guarantees an effective cleaning action. Due to the turbulence, the boundary lines of adjoing circular sectors 25 and 26 continuously move back and forth, thus producing an additional mechanical cleaning effect on both facing sides of the valve disks 4 and 5.

It will be understood that each of the elements described above, or two or more together, may also find a useful application in other types of constructions differing from the types described above.

While the invention has been illustrated and described as embodied in specific examples of a double seat valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of cleaning double seat valves of the type having two axially movable valve bodies defining an annular leakage space therebetween, and an annular leakage discharge conduit communicating with the leakage space, comprising the steps of ejecting at least three discrete jets of cleaning liquid along an inside wall of the discharge conduit, then bending each jet radially outwardly along the annular wall of the leakage space and spreading each jet into a sector on the periphery of the annular leakage space while mixing the liquid in adjoining sectors, then returning the mixed liquid from the periphery along the opposite wall of the leakage space and discharging the liquid along the opposite wall of the discharge conduit.

2. A double seat valve of the type having a housing provided with a valve seat insert, two opposite valve disks, means for moving the valve disks in axial direction independently one from the other into a first position against the valve seat insert and into a second position away from the insert, said valve disks defining in said first and second positions an annular leakage space therebetween and one of said valve disks supporting an annular discharge conduit communicating with the annular leakage space, the discharge conduit having two opposite inner walls, comprising at least three symmetrically arranged nozzles projecting in axial direction into said discharge conduit to eject jets of cleaning liquid along an inner wall of the discharge conduit into the leakage space, where the jets are bent radially outwardly along the inner surface of the upper valve disk and returned downwardly along the inner surface of the lower valve disk and discharged along the opposite inner wall of the discharge conduit.

3. A double seat valve as defined in claim 2, wherein said moving means includes a tubular hollow rod connected to the upper valve disk and extending axially through said housing, an inner rod connected at its end to the outer end of the discharge conduit, the lower valve disk being connected to the inner end of the discharge conduit, and said nozzles extending along the outer wall of said hollow rod.

4. A double seat valve as defined in claim 3, wherein an annular passage is formed between the inner wall of the hollow rod and the inner rod, said annular passage communicating with an inlet port for cleaning liquid and with said nozzles.

5. A double seat valve as defined in claim 4, wherein said inner rod is spring biased against said outer rod and is provided with a recessed step which cooperates with an annular step on the inner wall of the outer hollow rod to prevent clamping of the lower valve disk in its open position.

* * * * *